(12) United States Patent
Fiete et al.

(10) Patent No.: US 7,171,054 B2
(45) Date of Patent: Jan. 30, 2007

(54) SCENE-BASED METHOD FOR DETERMINING FOCUS

(75) Inventors: Robert D. Fiete, Fairport, NY (US); David C. Wilbur, Rochester, NY (US); Theodore A. Tantalo, Rochester, NY (US); Laura W. Loggi, Hilton, NY (US)

(73) Assignee: Eastman Kodak Company, Rochester, NY (US)

(*) Notice: Subject to any disclaimer, the term of this patent is extended or adjusted under 35 U.S.C. 154(b) by 823 days.

(21) Appl. No.: 10/427,398

(22) Filed: May 1, 2003

(65) Prior Publication Data

US 2004/0217257 A1    Nov. 4, 2004

(51) Int. Cl.
*G06K 9/40* (2006.01)
(52) U.S. Cl. .................. 382/255; 382/274; 382/275; 382/291; 358/1.5; 358/3.27
(58) Field of Classification Search ............... 382/255, 382/274, 275, 291; 358/1.5, 3.26, 3.27
See application file for complete search history.

(56) References Cited

U.S. PATENT DOCUMENTS

| 4,183,642 A |   | 1/1980  | Fukuoka |
|-------------|---|---------|---------|
| 5,166,506 A | * | 11/1992 | Fiete et al. ............... 250/201.7 |
| 5,338,924 A | * | 8/1994  | Barrett et al. ............ 250/201.4 |
| 5,693,439 A | * | 12/1997 | Tanaka et al. ................ 430/30 |
| 5,832,931 A | * | 11/1998 | Wachter et al. ............. 128/898 |
| 6,023,056 A |   | 2/2000  | Fiete et al. |

\* cited by examiner

*Primary Examiner*—Jingge Wu
*Assistant Examiner*—Yosef Kassa
(74) *Attorney, Agent, or Firm*—Stephen H. Shaw

(57) ABSTRACT

A method and application specific integrated circuit for determining focus for an image capture system using scene content within an image, including the steps of: acquiring, from the image, image data having different focus positions; dividing the image data into sub-images; calculating a sub-image sharpness value for each sub-image; calculating an image sharpness value for each focus position using the sub-image sharpness values; plotting the sharpness values versus the focus position; fitting a curve to the plot of the image sharpness values versus the focus position, wherein the curve has a peak sharpness value; and determining the focus of the image capture system from a point on the curve.

31 Claims, 5 Drawing Sheets

SCENE-BASED METHOD FOR DETERMINING FOCUS

FIELD OF THE INVENTION

The present invention relates generally to a method for determining the focus of image capture systems, for example cameras, input scanners, or document copiers, and in particular to a system and method for determining focus in such systems.

BACKGROUND OF THE INVENTION

FIG. 1 illustrates an image capture system, such as a camera, including an imaging optics 10 having a focal length, f and an imaging sensor 12, wherein the focal length is a property of the imaging optics 10. An object 14 at a distance $d_o$ in front of the camera will be properly focused at the imaging sensor 12 at a distance $d_i$ behind the imaging optics 10 if the relationship between $d_o$, $d_i$, and f is $$\frac{1}{d_o} + \frac{1}{d_i} = \frac{1}{f} \quad \text{(Equation 1)}$$

If the camera-to-object distance changes to a distance $d_o \pm \delta_o$ in front of the camera, as illustrated in FIG. 2, then the image will be out of focus by a distance $\delta_i$ given by $$\delta_i = \pm d_i \left(1 - \frac{1}{1 + \frac{d_i}{d_o} - \frac{d_i}{d_o \pm \delta_o}}\right) \quad \text{(Equation 2)}$$

Similarly, the image will be out of focus by $\delta_i$, if the focal length of the camera changes such that the focal plane is moved to a distance $d_i$-$\delta_i$ behind the imaging optics. No adverse effect to image quality will be perceived, if $\delta_i$ is within the depth of focus of the image capture system, given by $$\delta_i' = \pm 2\lambda \left(\frac{f}{D}\right)^2 \quad \text{(Equation 3)}$$

where D is the entrance aperture diameter of the image capture system. The corresponding depth of field $\delta'_o$ is given by $$\delta_o' = \pm 2\lambda \left(\frac{d_o}{D}\right)^2 \quad \text{(Equation 4)}$$

hence objects within the range of $d_o \pm \delta'_o$ will not appear out of focus.

The correct focus of an image capture system can change over time due to dynamic changes to the system, such as those caused by the thermal environment. When the focal length changes the depth of field by more than $\delta'$ or the camera-to-object distance changes more than $\delta'_o$, it is necessary to refocus the image capture system. Many methods for correcting the focus of the imaging system have been disclosed in prior art, with most methods requiring additional optics and sensors. Scene-based methods have the advantage that focus is determined by analyzing the image data collected of the scene, usually using the same optics and detector used to acquire the in-focus images.

Prior scene-based methods for determining the focus have been proposed that compare the sharpness between image data formed at various focus positions. The focus method disclosed in U.S. Pat. No. 4,183,642 by Fukuoka, on Jan. 15, 1980, titled "AUTOMATIC FOCUSING DEVICES," finds a focus position that maximizes the contrast difference between adjacent pixels as the focus changes between images. Many scene-based methods assume that the plurality of images collected at different focus positions do not shift, rotate, or change in scale; thus the only change between the images on a pixel-per-pixel basis is the change in focus. If the imaging system moves between images, then these methods with such an assumption do not work well, unless the plurality of images are spatially registered to sub-pixel accuracy.

The relative shift between images can be avoided by imaging the same scene multiple times at different focus positions, simultaneously, through the same boresight to determine focus. One such method proposed in U.S. Pat. No. 5,166,506 by Fiete et al. on Nov. 24, 1992, titled "METHOD FOR DETERMINING AN IMAGING SYSTEM FOCUS ERROR," uses beam splitters to image the scene onto a plurality of sensors. This method, however, requires additional optical elements and the beam splitters reduce the signal arriving at each sensor. The method proposed in U.S. Pat. No. 6,023,056 by Fiete et al. on Feb. 8, 2000, titled "SCENE-BASED AUTOFOCUS METHOD," correlates a step function with the edges in the scene at various focus positions, thus it is insensitive to changes in scale, rotation, and position; but the location of the edges are usually not known, hence, requiring the calculation of the edge correlation for all of the image data, which can be computationally intensive for large images.

There is a need therefore for a scene-based focus method that is not computationally intensive, does not require precise alignment or spatial registration of a plurality of images collected at different focus positions, and does not require additional optical elements in the design of the image capture system.

SUMMARY OF THE INVENTION

The present invention is directed to overcoming one or more of the problems set forth above. Briefly summarized, according to one aspect of the present invention, the object of the present invention is to provide a method that determines the focus of an image for an image capture system. The image capture system includes an image processor that determines the focus position from the acquired image. According to the present invention, a method of determining focus in an image capture system of the type having an image sensor, optics for forming an image of a scene on the image sensor, and an image processor for determining the focus. Image data is acquired having different focus positions. The image data may be acquired from one or more images. The image data is divided into sub-images and a sharpness value is calculated for each sub-image. The sharpness values for each sub-image are used to produce a sharpness value for each focus position. The sharpness values are plotted versus the focus position and a curve is fit to the plot. The focus of the imaging system is determined from a point on the curve.

ADVANTAGEOUS EFFECT OF THE INVENTION

The present invention has the advantage of determining the focus of an image capture system using image data of a scene, without additional optics or sensors, and without requiring precise alignment or registration between the plurality of images.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts.

Other aspects of such algorithms and systems, and hardware and/or software for producing and otherwise processing the images involved or co-operating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware or firmware known as application specific integrated circuits (ASICs). An ASIC may be designed on a single silicon chip to perform the method of the present invention. The ASIC can include the circuits to perform the logic, microprocessors, and memory necessary to perform the method of the present invention. Multiple ASICs may be envisioned and employed as well for the present invention.

Figure 3:
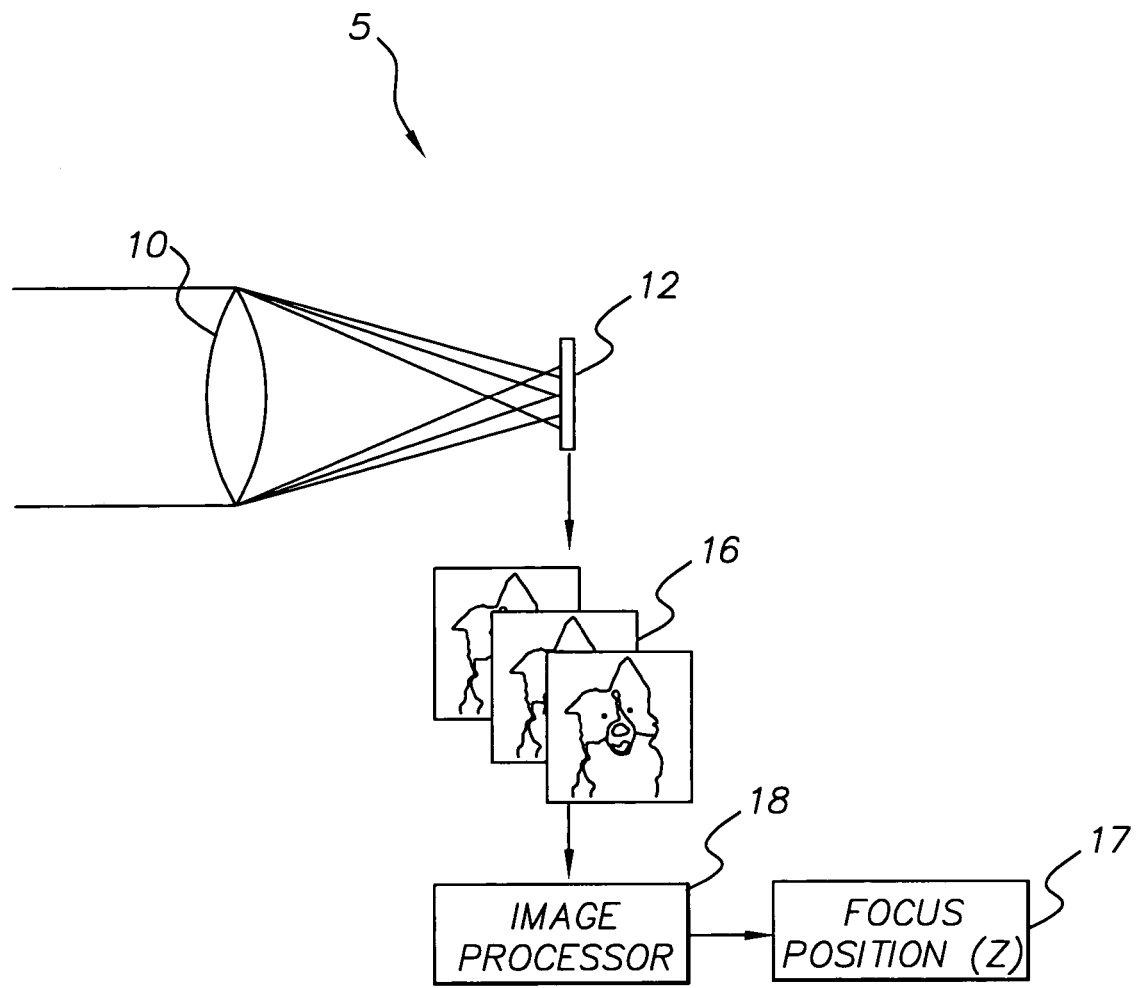
FIG. 3 is a schematic diagram of a focus detecting system according to one embodiment of the present invention.

Referring to FIG. 3, a focus detecting system, according to the present invention, includes an image capture system 5, including imaging optics 10, an imaging sensor 12, and an image processor 18 used to determine the focus position 17. The method for determining the focus position 17 in the present invention requires the image capture system 5 to acquire image data such that the focus position changes for different sets of image data. In one embodiment, a plurality of N images 16, each denoted by $i_n(x,y)$, with each image captured at a different focus position. The focus position 17 can be changed by changing the focal length of the imaging system 5 or by moving the imaging sensor 12. Let N be the total number of images captured for determining the focus position 17 and let n be the number of the image collected ($1 \leq n \leq N$). The number of images N needs to be greater than 2, and the accuracy of the focus estimation will improve with increasing N.

Figure 1:
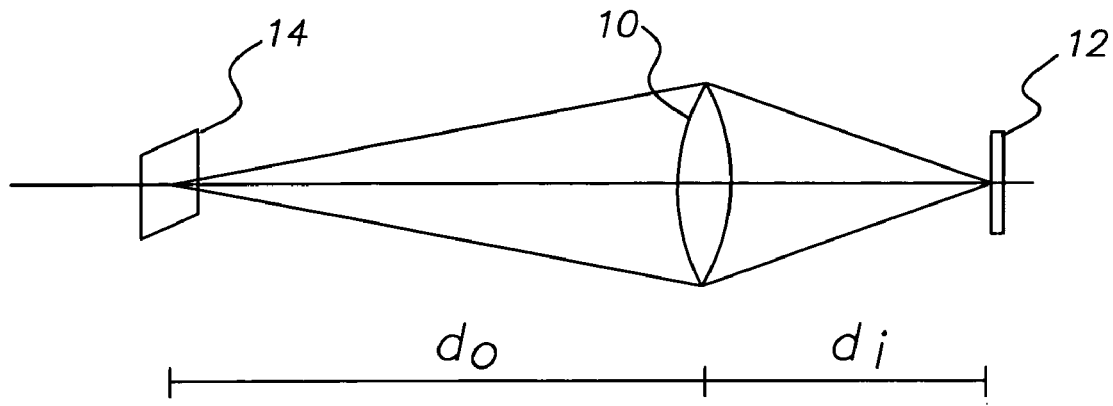
FIGS. 1 and 2 are schematic diagrams of a prior art imaging system useful in describing the background of the present invention, showing the imaging system in and out of focus respectively.
Figure 2:
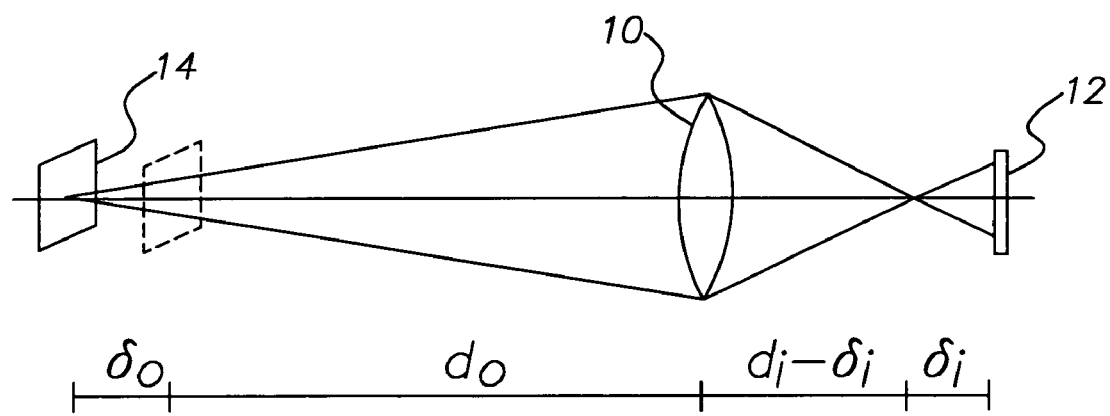

In another embodiment, focus can be determined from a single image when a linear imaging sensor scans the scene 14, shown in FIG. 2, and changes the focus into N steps during the acquisition of the image. The lines of image data that share a common focus position become $i_n(x,y)$. This embodiment performs well when the scene information is similar throughout the image. The embodiment using a plurality of images will be illustrated for the rest of the detailed discussion of the invention and it is understood that the plurality of images can be sections of image data in another embodiment.

The direction of the changing focus position 17 in the imaging system will be denoted as the z direction. The focus position 17 can be changed using many different methods, such as using a single imaging sensor and changing the focus by changing the focal length of the imaging system or the location z of the imaging sensor. Another method of acquiring a plurality of images at different focus positions uses different imaging sensors at different z locations. If different imaging sensors are used, then they must all be calibrated properly to remove detector response differences between the different sensors. In one embodiment, a single imaging detector is used and the focus position is changed by changing the distance $d_i$.

Each image $i_n(x,y)$ is acquired with the focus position 17 at a different location z. The focus position should be within the range of focus change used to capture the image $i_n(x,y)$. The range of defocus from the first image, $i_1(x,y)$, to the last image, $i_N(x,y)$, should span a range much greater (e.g. 4 times greater) than the depth of focus of the image capture system, defined in Equation 3 above. The focus position z is recorded for each image $i_n(x,y)$ and stored in the image processor 18. This is necessary so that a sharpness value calculated for each image can later be referenced to the corresponding focus position z.

Figure 4:
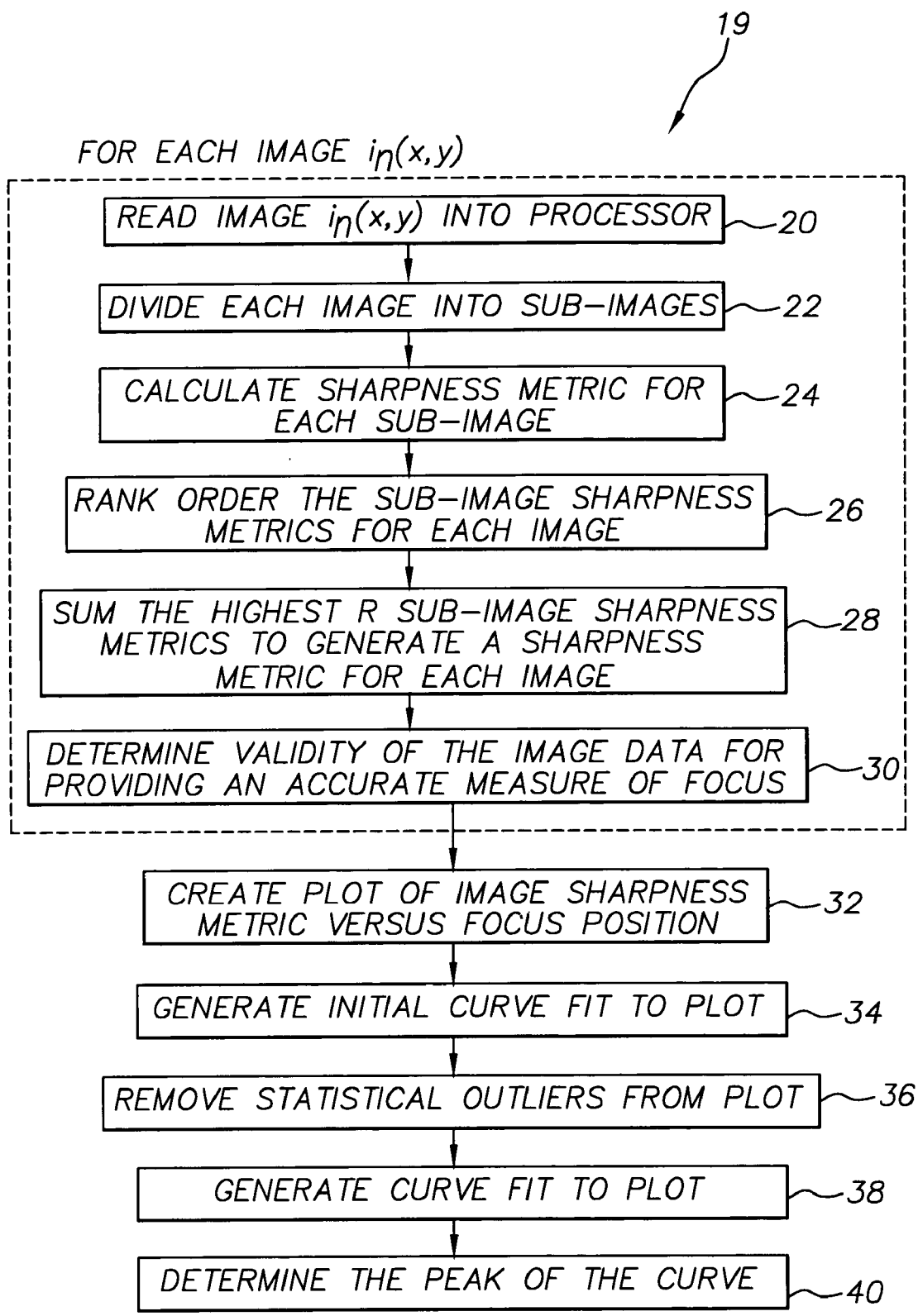
FIG. 4 shows the image processing steps, according to the present invention, for determining the focus.
Figure 5:
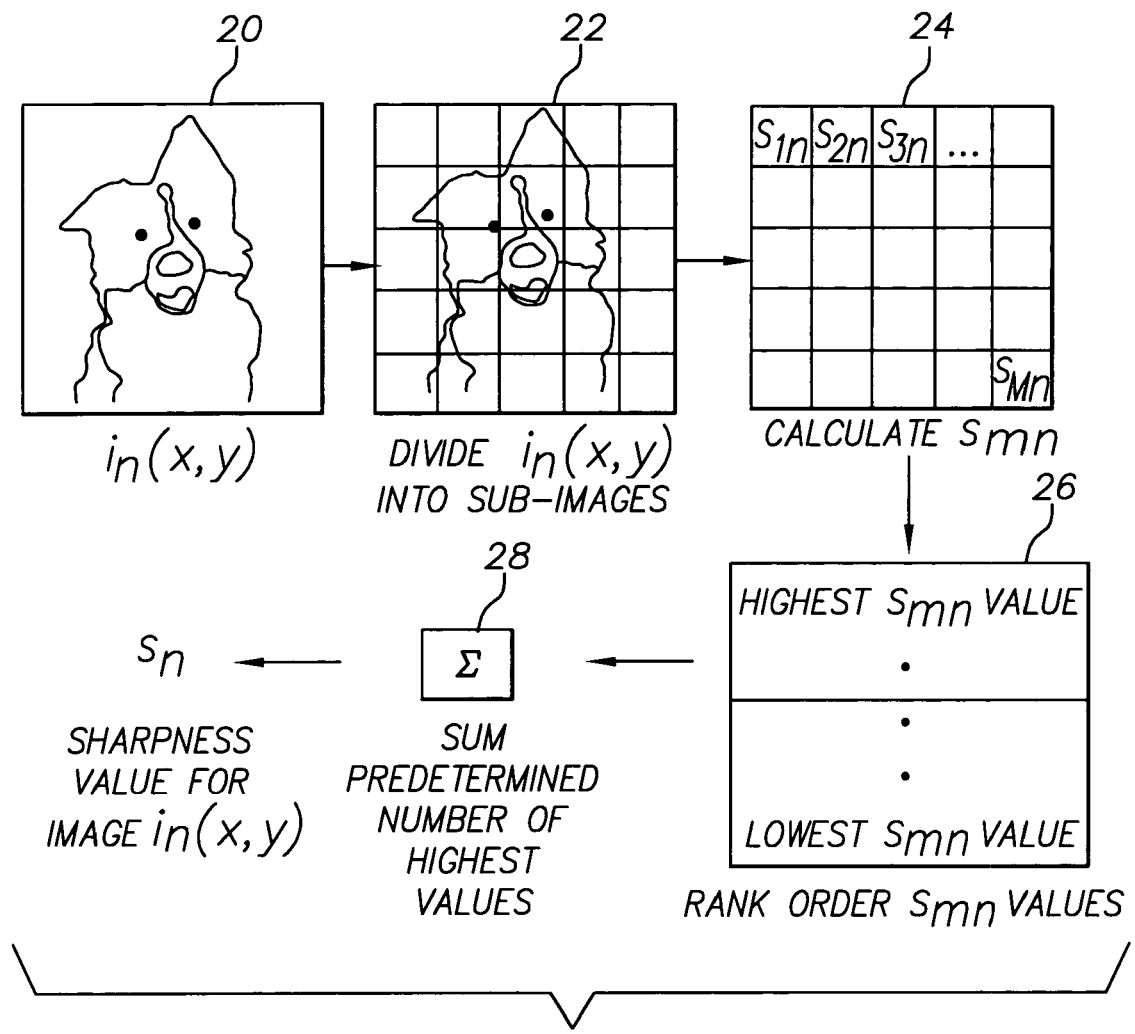
FIG. 5 illustrates the image processing steps, according to the present invention, for determining the sharpness value for each image.

The image processor 18 in FIG. 3 processes the images, $i_n(x,y)$, to determine the value of z for focus position 17. The flow diagram 19 for the image processor 18 is shown in FIG. 4 and corresponding steps 20–28 of flow diagram 19 are illustrated in FIG. 5. In operation 20, shown in FIG. 5, each image $i_n(x,y)$ is read into the processor and then operation 22 divides it into M sub-images, where m is the number of the sub-image ($1 \leq m \leq M$). In one embodiment, the sub-images are divided into sub-images of size 8×8 pixels. In operation 24, a sharpness metric is used to calculate a sharpness value $S_{mn}$ for each sub-image. The sharpness metric can be any metric that relates to the variations of the image data. Candidate metrics include variance, covariance, skewness, kurtosis, energy, entropy, contrast, edge filtering, texture, and power spectrum of the image. In one embodiment the sub-image sharpness metric for calculating $S_{mn}$ is the variance of the image data within the sub-image. If the sub-image contains K pixels, then the sub-image sharpness metric of the $m^{th}$ sub-image in the $n^{th}$ image is given by $$S_{mn} = \frac{\sum_{k=1}^{K}(i_{mn}(k) - \bar{i}_{mn})^2}{K-1} = \frac{K\sum_{k=1}^{K}i_{mn}^2(k) - \left(\sum_{k=1}^{K}i_{mn}(k)\right)^2}{K(K-1)} \quad \text{(Equation 5)}$$

where $\bar{i}_{mn}$ is the mean of the image data within the sub-image.

The sub-image sharpness values $S_{mn}$ are used to calculate an image sharpness value $S_n$ for each focus position. In one embodiment, operation 26 rank-orders the sub-image sharpness values from highest to lowest to form a list of values $S_{mn}(r)$, where r is the ranking number of the sub-image sharpness value. A summing operation 28 for a predetermined number R of sub-image sharpness values are summed to calculate an image sharpness value $S_n$, given by $$S_n = \sum_{r=1}^{R} S_{mn}(r) \quad \text{(Equation 6)}$$

If R=1, then sharpness value for each image equals the highest sub-image sharpness value within each image. If R=M, then the sharpness value for each image is the sum of all of the sub-image sharpness values for that image, given by $$S_n(R=M) = \sum_{m=1}^{M} S_{mn} = \sum_{m=1}^{M} \frac{K\sum_{k=1}^{K}i_{mn}^2(k) - \left(\sum_{k=1}^{K}i_{mn}(k)\right)^2}{K(K-1)} \quad \text{(Equation 7)}$$

The value for R can be chosen experimentally, i.e. the value for R that results in the most accurate determination of the proper focus from test data, or R can be calculated from image parameters, such as the number of sub-image sharpness values that are above a calculated noise level.

Some scenes do not contain enough high spatial frequency content to provide a significant change in the sharpness value as the focus position changes. Operation 30 of FIG. 4 performs an image metric, based on the image content, to determine whether or not the image data is valid for providing a measure for focus within the accuracy defined by the user. The image data will not be used if the metric determines that the image data cannot provide an accurate measure for focus. In one embodiment, two metrics are used to determine the validity of the image data. The first metric calculates the normalized variance of the image sharpness values, given by $$A_{var} = \frac{\sigma_{S_n}^2}{\bar{S}_n} = \frac{\sum_{m=1}^{M}(S_n - \bar{S}_n)^2}{\sum_{m=1}^{M} S_n} \quad \text{(Equation 8)}$$

where $\sigma_{S_n}^2$ is the variance and $\bar{S}_n$ is the mean of the image sharpness values. $A_{var}$ is compared to a threshold $T_{var}$. If $A_{var} < T_{var}$, then the image data is rejected for determining an accurate measure of focus. The second metric used in one embodiment calculates the normalized range of the image sharpness values, given by $$A_{range} = \frac{MAX(S_n) - MIN(S_n)}{\bar{S}_n} \quad \text{(Equation 9)}$$

where $MAX(S_n)$ is the maximum value and $MIN(S_n)$ is the minimum value of the image sharpness values. $A_{range}$ is compared to a threshold $T_{range}$. If $A_{range} < T_{range}$, then the image data is rejected for determining an accurate measure of focus. In one embodiment, the values used for $T_{var}$ and $T_{range}$ are derived from experimental data.

Figure 6:
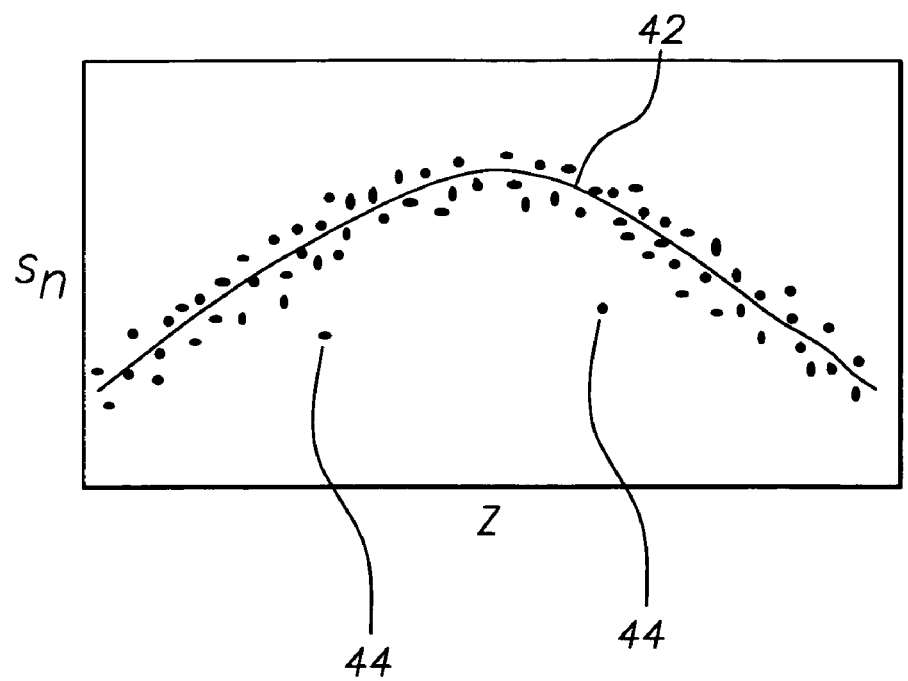
FIG. 6 illustrates the plot of $S_n$ as a function of z with the initial curve fit.

Operation 32 plots the image sharpness value $S_n$, for each image, $i_n(x,y)$ versus the corresponding focal plane position z recorded for each image $i_n(x,y)$. Subsequently operation 34 fits a curve 42 to the plot of $S_n$ as a function of z, as illustrated in FIG. 6. In one embodiment of the invention a fifth order polynomial is used to fit the curve 42 to the plot. In another embodiment of the invention a mathematical model of the focus curve derived from empirical measurements is used to fit the curve 42 to the plot.

A statistical analysis operation 36 removes statistical outlier data points 44 (shown in FIG. 6) from further analysis. The statistical outliers 44 will be defined as points lying outside a boundary that is dependent on the standard error of estimate $s_e$, given by $$s_e = \sqrt{\frac{\sum_{n=1}^{N}[S_n - \hat{S}_n]^2}{N-2}} \quad \text{(Equation 10)}$$

where $\hat{S}_n$ is the curve fit 42 to $S_n$. Values of $S_n$ that do not satisfy the condition $|S_n - \hat{S}_n| < T_s$ are determined to be outliers. The outlier threshold $T_s$ is proportional to $s_e$ and is typically set equal to $3s_e$.

Figure 7:
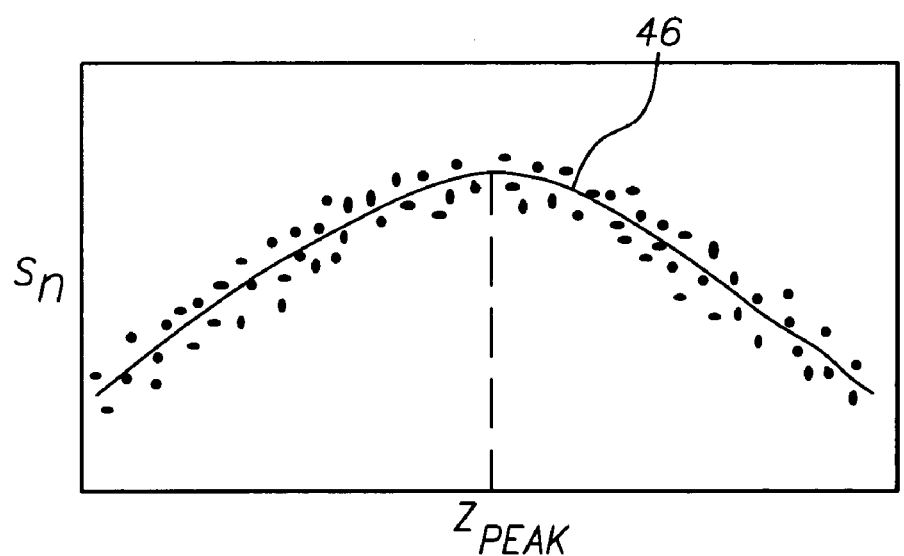
FIG. 7 illustrates the plot of $S_n$ as a function of z with the final curve fit and $Z_{peak}$ determined.

The statistical outliers 44 are removed from the plot and operation 38 fits a new curve 46 to the plot, as illustrated in FIG. 7. Finally, operation 40 determines the value $Z_{peak}$ that corresponds to the peak of the curve 46. The focus position z that results in the focus and the sharpest image quality is $Z_{peak}$. In one embodiment, the focus position of the imaging system is adjusted to $Z_{peak}$. In another embodiment, the focus position of the imaging system is adjusted to a position within the depth of focus of $Z_{peak}$.

The method of determining focus according to the present invention was applied to an image capture system designed for remote imaging and compared to prior art methods of deter-mining focus. The method of the present invention proved more easily implemented than the methods of the prior art, and was consistently capable of determining focus. The method proved surprisingly robust across different type of scenes, even for scenes that did not appear to contain a great deal of edge information.

The invention has been described with reference to a preferred embodiment; However, it will be appreciated that variations and modifications can be effected by a person of ordinary skill in the art without departing from the scope of the invention.

PARTS LIST:

| | |
|---|---|
| 5 | imaging system |
| 10 | imaging optics |
| 12 | imaging sensor |
| 14 | object in scene |
| 16 | image data acquired at different focus positions |
| 17 | focus position z |
| 18 | image processor |
| 19 | flow diagram |
| 20 | read image $i_n(x, y)$ into the image processor operation |
| 22 | divide the image into sub-images operation |
| 24 | calculate the sub-image sharpness value operation |
| 26 | rank order the sub-image sharpness values operation |
| 28 | sum the highest R sub-image sharpness values operation |
| 30 | determine data validity operation |
| 32 | create plot operation |
| 34 | generate initial curve fit operation |
| 36 | remove outliers operation |
| 38 | generate curve fit operation |
| 40 | determine the peak of the curve operation |
| 42 | initial curve fit to image sharpness values |
| 44 | data outliers |
| 46 | final curve fit to image sharpness values |

What is claimed is:

1. A method of determining focus for an image capture system using scene content within an image, comprising the steps of:
    a) acquiring, from the image, image data having different focus positions;
    b) dividing the image data into sub-images;
    c) calculating a sharpness value for each sub-image;
    d) calculating an image sharpness value for each focus position using the sub-image sharpness values;
    e) plotting the image sharpness value versus the focus position;
    f) fitting a curve to the plot of the image sharpness values versus the focus position, wherein the curve has a peak sharpness value; and
    g) determining the focus of the image capture system from a point on the curve.

2. The method of determining focus claimed in claim 1, wherein the point on the curve is within a depth of focus relative to the image capture system.

3. The method of determining focus claimed in claim 1, wherein the point on the curve is at a peak of the curve.

4. The method of determining focus claimed in claim 1, further comprising the step of performing the steps a–g for each desired image prior to capturing the desired image.

5. The method of determining focus claimed in claim 1, wherein the sub-image sharpness values are calculated from one or more equations selected from the group consisting of variances, covariances, skewness, kurtosis, energy, entropy, contrast, edges, textures, and a power spectrum of the image.

6. The method of determining focus claimed in claim 1, wherein the image sharpness value is calculated by summing some or all of the sub-image sharpness values.

7. The method of determining focus claimed in claim 1, wherein the image sharpness value is calculated by rank-ordering the sub-image sharpness values into high and/or low ranks and summing some or all of the highest sub-image sharpness values.

8. The method of determining focus claimed in claim 7, wherein the number of sub-image sharpness values summed is determined from the image data.

9. The method of determining focus claimed in claim 1, further comprising the step of rejecting data that does not meet specified criteria.

10. The method of determining focus claimed in claim 1, further comprising the step of eliminating sub-image sharpness values prior to fitting the curve to the plot of image sharpness values versus focus position.

11. The method of determining focus claimed in claim 1, wherein the image capture system is selected from the group consisting of a camera, a remote sensing system, an input scanner, and a document copier.

12. A method of determining focus for an image capture system using scene content from a plurality of images, comprising the steps of:
    a) acquiring image data from the plurality of images, wherein the plurality of images have different focus positions;
    b) dividing the image data into sub-images;
    c) calculating a sub-image sharpness value for each sub-image;
    d) calculating an image sharpness value for each focus position using the sub-image sharpness values;
    e) plotting the sharpness value versus the focus position;
    f) fitting a curve to the plot of the image sharpness values versus the focus position, wherein the curve has a peak sharpness value; and
    g) determining the focus of the image capture system from a point on the curve.

13. The method of determining focus claimed in claim 12, wherein the point on the curve is within a depth of focus relative to the image capture system.

14. The method of determining focus claimed in claim 12, wherein the point on the curve is at a peak of the curve.

15. The method of determining focus claimed in claim 12, further comprising the step of performing the steps a-g for each desired image prior to capturing the desired image.

16. The method of determining focus claimed in claim 12, wherein the sub-image sharpness values are calculated from one or more equations selected from the group consisting of variances, covariances, skewness, kurtosis, energy, entropy, contrast, edges, textures, and a power spectrum of the image.

17. The method of determining focus claimed in claim 12, wherein the image sharpness value is calculated by summing some or all of the sub-image sharpness values.

18. The method of determining focus claimed in claim 12, wherein the image sharpness value is calculated by rank-ordering the sub-image sharpness values into high and/or low ranks and summing some or all of the highest sub-image sharpness values.

19. The method of determining focus claimed in claim 18, wherein the number of sub-image sharpness values summed is determined from the image data.

20. The method of determining focus claimed in claim 12, further comprising the step of rejecting data that does not meet specified criteria.

21. The method of determining focus claimed in claim 12, further comprising the step of eliminating sub-image sharpness values prior to fitting the curve to the plot of image sharpness values versus focus position.

22. The method of determining focus claimed in claim 12, wherein the image capture system is selected from the group consisting of a camera, a remote sensing system, an input scanner, and a document copier.

23. An application specific integrated circuit for performing the steps of:
 a) acquiring, from an image, image data having different focus positions;
 b) dividing the image data into sub-images;
 c) calculating a sub-image sharpness value for each sub-image;
 d) calculating an image sharpness value for each focus position using the sub-image sharpness values;
 e) plotting the image sharpness value versus the focus position;
 f) fitting a curve to the plot of the image sharpness values versus the focus position, wherein the curve has a peak sharpness value; and
 g) determining the focus of the image capture system from a point on the curve.

24. An application specific integrated circuit for performing the steps of:
 a) acquiring image data from a plurality of images, wherein the plurality of images have different focus positions;
 b) dividing the image data into sub-images;
 c) calculating a sub-image sharpness value for each sub-image;
 d) calculating an image sharpness value for each focus position using the sub-image sharpness values;
 e) plotting the image sharpness value versus the focus position;
 f) fitting a curve to the plot of the image sharpness values versus the focus position, wherein the curve has a peak sharpness value; and
 g) determining the focus of the image capture system from a point on the curve.

25. A computer storage medium having instructions stored thereon for causing a computer to perform the method of claim 1.

26. A computer storage medium having instructions stored thereon for causing a computer to perform the method of claim 12.

27. A computer storage medium having instructions stored thereon for causing a computer to perform the method of claim 13.

28. A computer storage medium having instructions stored thereon for causing a computer to perform the method of claim 14.

29. A computer storage medium having instructions stored thereon for causing a computer to perform the method of claim 18.

30. The application specific integrated circuit according to claim 24 for performing the step of calculating the sub-image sharpness values by rank-ordering the sub-image sharpness values into high and/or low ranks and summing some or all of the highest sub-image sharpness values.

31. The application specific integrated circuit according to claim 24 for performing the step of calculating the sub-image sharpness values by summing some or all of the sub-image sharpness values.

* * * * *